(12) United States Patent
Koc et al.

(10) Patent No.: US 11,349,413 B2
(45) Date of Patent: May 31, 2022

(54) METHOD FOR CLOSED-LOOP MOTION CONTROL FOR AN ULTRASONIC MOTOR

(71) Applicant: PHYSIK INSTRUMENTE (PI) GMBH & CO. KG, Karlsruhe (DE)

(72) Inventors: Burhanettin Koc, Ettlingen (DE); Bülent Delibas, Weingarten (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 200 days.

(21) Appl. No.: 16/633,940

(22) PCT Filed: Jul. 25, 2018

(86) PCT No.: PCT/EP2018/070096
§ 371 (c)(1),
(2) Date: Jan. 24, 2020

(87) PCT Pub. No.: WO2019/020658
PCT Pub. Date: Jan. 31, 2019

(65) Prior Publication Data
US 2020/0204088 A1 Jun. 25, 2020

(30) Foreign Application Priority Data
Jul. 25, 2017 (EP) .................................... 17183131

(51) Int. Cl.
*H02N 2/06* (2006.01)
*H02N 2/02* (2006.01)

(52) U.S. Cl.
CPC ............. *H02N 2/062* (2013.01); *H02N 2/025* (2013.01)

(58) Field of Classification Search
CPC ........ H02N 2/062; H02N 2/025; H02N 2/026; H02N 2/0025
See application file for complete search history.

(56) References Cited

U.S. PATENT DOCUMENTS

| 5,237,237 A | 8/1993 | Ueda et al. |
| 6,100,622 A * | 8/2000 | Yamamoto ............. H02N 2/142 310/316.01 |

(Continued)

FOREIGN PATENT DOCUMENTS

| EP | 0297574 A2 | 1/1989 |
| JP | H 01-107670 A | 4/1989 |

(Continued)

OTHER PUBLICATIONS

Pang et al., "Performance Evaluation of Dual-Frequency Driving Plate Ultrasonic Motor Based on an Analytical Model", IEEE Transactions on Ultrasonics, Ferroelectrics, and Frequency Control, Aug. 22, 2011, pp. 1641-1650, vol. 58, No. 8.

(Continued)

*Primary Examiner* — Emily P Pham
(74) *Attorney, Agent, or Firm* — Buchanan Ingersoll & Rooney PC

(57) ABSTRACT

A method is disclosed for closed-loop motion control of an ultrasonic motor having at least one actuator with an excitation electrode and at least one common electrode, an element to be driven, a controller and at least one electrical generator for generating at least first and second excitation voltages U1 and U2 to be applied to the electrodes of the actuator for vibration of the actuator. A friction element of the actuator, due to its vibration, intermittently contacts the element to be driven with a driving force. The method includes providing the at least two excitation voltages U1 and U2 with different resemblance frequencies, a frequency difference deviating from a servo sampling frequency of the controller by 5 kHz at the most, and simultaneously applying the excitation voltages to the electrodes of the actuator.

16 Claims, 16 Drawing Sheets

(56) References Cited

U.S. PATENT DOCUMENTS

Figure 1:
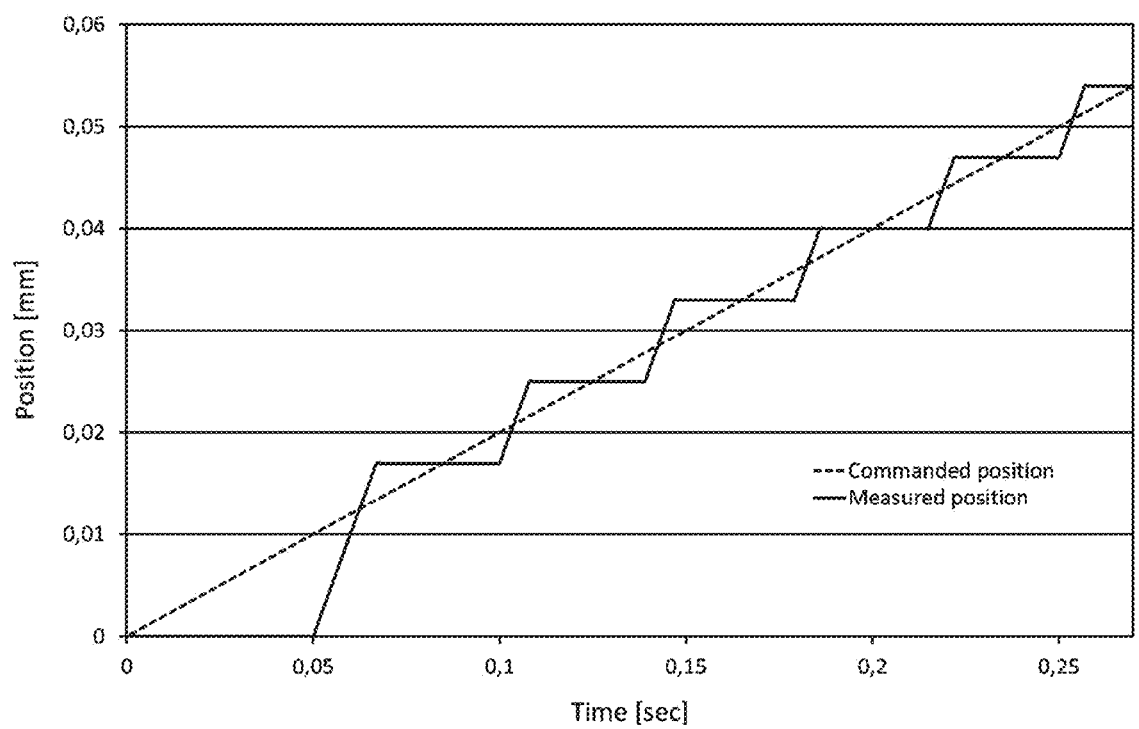

| | | |
|---|---|---|
| 6,747,391 B1 | 6/2004 | Ben-Yaakov |
| 10,326,383 B2 | 6/2019 | Stiebel et al. |
| 2006/0250047 A1 | 11/2006 | Yamamoto et al. |
| 2009/0185400 A1* | 7/2009 | Okui .................... H02M 7/493 363/71 |
| 2009/0224630 A1 | 9/2009 | Adachi et al. |
| 2018/0006583 A1 | 1/2018 | Stiebel et al. |

FOREIGN PATENT DOCUMENTS

| | | |
|---|---|---|
| JP | H04-38180 A | 2/1992 |
| JP | H 08-168274 A | 6/1996 |
| JP | H09285149 A | 10/1997 |
| JP | 2000287467 A | 10/2000 |
| JP | 2015192469 A | 11/2015 |
| JP | 2017539199 A | 3/2017 |
| WO | 2016-091443 A1 | 6/2016 |

OTHER PUBLICATIONS

Office Action (Notice of Grounds of Rejection) dated Jul. 6, 2021, by the Japanese Patent Office in corresponding Japanese Patent Application No. 2020-503936, and an English Translation of the Office Action. (9 pages).

Office Action (Notice of Preliminary Rejection) dated Jul. 19, 2021, by the Korean Patent Office in corresponding Korean Patent Application No. 10-2020-7002190, and an English Translation of the Office Action. (8 pages).

Office Action (Notice of Grounds of Rejection) dated Jan. 5, 2021, by the Japanese Patent Office in corresponding Japanese Patent Application No. 2020-503936, and an English Translation of the Office Action. (11 pages).

International Search Report and Written Opinion issued in corresponding International Patent Application No. PCT/EP2018/070096, 9 pages (dated Oct. 22, 2018).

Official Action dated Feb. 8, 2022 in corresponding Japanese Patent Application No. 2020-503936, with attached English-language translation.

* cited by examiner

METHOD FOR CLOSED-LOOP MOTION CONTROL FOR AN ULTRASONIC MOTOR

This invention comprises a method for closed-loop motion control of an ultrasonic motor according to claims 1 to 10.

Ultrasonic motors (UM) with one actuator or several actuators made of a piezoelectric or electrostrictive or magnetostrictive material are replacing the classical drive elements like electromagnetic drives due to their specific advantages. In this context, UM can achieve much higher positioning accuracies in sub-nanometer range due to a missing backlash. Furthermore, UM can be designed and constructed with fewer parts than electromagnetic systems, such that UM are compacter. Besides, UM consume less energy, and their efficiency is not changing drastically with dimensions. With UM, a direct actuation without any requirement of mechanical system like gear assembly is possible. In addition to the aforementioned advantages of UM over electromagnetic drives, UM are highly dynamic drives.

In general, motion with UM is generated through friction interaction between a vibrator or actuator (stator) and a body or element, respectively, to be driven (rotor or slider). There is always a nonlinearity or a dead zone, respectively, which is a threshold of voltage level to be exceeded in order to create a first motion of the rotor or slider, i.e. a breakaway force or torque has to be overcome. Contact friction which is existent between the contacting surfaces of the stator and the rotor is a highly nonlinear phenomenon. Additionally, there is no direction symmetry with respect to said dead zone, and the position of the boundaries of the dead zone is unpredictable, which causes a nonlinearity and hysteresis with respect to voltage-speed characteristic. The difference between static and dynamic friction properties of mating surfaces even worsen the aforementioned nonlinearities.

The voltage for overcoming the breakaway force can be compensated with offset values in the linear control mechanism. There are various control concepts to get high precision trajectory following in precision stages. But still, UM have not been able to be driven precisely with small motion at velocities in the mixed friction region where friction values change from static to dynamic or vice versa. Precise smooth motion especially at low velocities is in particular demanded at biomedical devices, robotic arms, medical operations and microscopy stages. Noiseless actuation during the operation is a prerequisite for the above mentioned applications. This nonlinear characteristic, especially at low velocity drive, is always associated not only with discontinuous stick-slip movement with high positioning errors, but also unpleasant audible squeak and noise. Acoustic sound is especially magnified when frequency at low velocity matches to the natural frequency of the piezomotor systems with mass, spring and damper.

US 2006250047 A1 discloses an open-loop low speed driving method for a piezoelectric motor having two drive electrodes or terminals, respectively. Here, a first vibration mode is generated by exciting the two active terminals with two signals that are in phase, and a second vibration mode is generated by exciting the two active terminals with two signals that are in reverse phase. In order to obtain a slow movement, both terminals are excited at the same time with voltage signals being in phase and having same frequency, thereby changing the magnitude of the current going to each terminal.

For a piezoelectric element operating at or near a resonance frequency, the magnitude of the vibration generated on the piezoelectric element is proportional to the current going to the element. By altering current passing through each terminal, vibration amplitude of each side and thus direction of the oblique motion at the friction tip can be adjusted. The direction of the oblique motion is changing proportionally with motor speed. Depending on the demand, if a slow speed is needed, the current passing to one terminal is selected with a small difference compared to the other terminal, and the generated direction of the oblique motion is close to 90 degrees. If a fast speed is necessary, the angle of the oblique motion is selected to be around 45 degrees to the slider element, which means that the current passing to one terminal is selected with a large difference compared to the other terminal. However, having a vibratory motion that is almost perpendicular to the moving slider element decreases the motor performance such as push pull force or torque, and causes mechanical vibration resulting in unpleasant audible noise.

A method for closed-loop motion control of a piezoelectric motor with two drive electrodes being fed by periodic control voltages from two separate power sources is known from U.S. Pat. No. 6,747,391 B1 where two vibration modes are applied to a piezoelectric actuator in order to get higher performance and better controllability. Here, a single source square wave input is loaded to the piezoelectric actuator in order to catch two resonance modes from harmonics simultaneously. However, the accuracy of said piezoelectric motor especially at low velocities is poor.

Therefore, the task of this invention is to provide a method for closed-loop motion control of an ultrasonic motor with an improved positioning accuracy and insignificant noise generation at low velocities.

Said task is solved with the method according to claim 1, with the following sub-claims describing at least appropriate embodiments of the invention.

The inventive method for closed-loop motion control with position feedback is intended for an ultrasonic motor comprising at least one actuator made of piezoelectric or electrostrictive or magnetostrictive material with a friction means or friction portion, with at least one excitation electrode and with at least one common electrode, and with the ultrasonic motor in addition comprising an element to be driven. The ultrasonic motor further comprises a controller and at least one electrical generator for generating at least a first excitation voltage $U_1$ and a second excitation voltage $U_2$ to be simultaneously applied to the electrodes of the actuator and thereby generating vibration of the actuator, wherein the friction means of the actuator, due to its vibration, intermittently comes into contact with the element to be driven and thereby generating a driving force on the element to be driven.

The inventive method for such an ultrasonic motor comprises the step of providing said at least two excitation voltages $U_1$ and $U_2$ generated by the at least one electrical generator with different frequencies, the frequency of $U_1$ corresponding to a first resonance frequency of the actuator and the frequency of $U_2$ corresponding to a second resonance frequency of the actuator, and with the frequency difference between $U_1$ and $U_2$ deviating from a servo sampling frequency of the controller by 5 kHz at the most, and applying said at least two excitation voltages $U_1$ and $U_2$ to the electrodes of the actuator simultaneously or at the same time, respectively.

Known closed-loop motion control of UM generally operates at a constant servo sampling frequency which is the number of servo cycles done in one second. After reading feedback from an encoder (i.e. position feedback), the controller reacts to the new position of the UM by recalculating and adjusting the drive signal or voltage according to the commanded position using control algorithms like Proportional Integration Derivative (PID) at the beginning of each servo cycle or servo sampling period, respectively. The UM with adjusted drive signal responds to this position change. The controller is ready to receive the next feedback, and the position control cycle repeats.

UM normally operate at resonance frequencies in the range of 40 kHz to 500 kHz, and typical motion controllers used for UM have servo sampling frequencies of 10 kHz to 20 kHz, resulting in 3 to 10 oscillations of the actuator and its friction means at the operating frequency in one single servo sampling period of the motion controller. For example, it is assumed that the first oscillation within one single servo sampling period exceeds the static friction force and makes the rotor or slider to be moved. Once the slider starts to move, the subsequent oscillations in the same servo sampling period generate further movement of the slider. Here, it is highly possible that the amount of motion at the end of the servo sampling period is (excessively) higher than the commanded position. The amount of motion is unpredictable due to the friction nonlinearities. This problem especially at low velocities even severely affects positioning accuracy of the slider.

According to the invention, the UM is operated by a method using at least two excitation voltages $U_1$ and $U_2$ generated by at least one electrical generator in order to excite at least two eigenfrequency-modes at two different resonance frequencies of the actuator. The exited two resonance frequencies of the actuator resulting in the vibrations of the actuator to be modulated, and a mixed oscillation of the actuator or the friction means attached to it, respectively, is obtained. The resulting movement of the friction means—which is responsible for the motion or movement of the element to be driven with which the friction means intermittently comes into contact—has two trigonometric components with changing amplitudes and frequencies. Therefore, direction of movement of the friction means varies with respect to time. The aforementioned particular oscillations suppress the nonlinearities of friction at the contact surfaces of the actuator or its friction means, respectively, and the element to be driven.

Since the frequency difference of the excitation voltages $U_1$ and $U_2$ is similar to the servo sampling frequency value, i.e. the frequency difference between $U_1$ and $U_2$ deviates from a servo sampling frequency of the controller by 5 kHz at the most, acceleration of the UM just over the breakaway friction level can be controlled within one closed-loop controlled sampling time (servo loop or servo cycle) completely.

As the inventive method utilizes at least two resonance modes at two different exciting frequencies which are similar to the sampling frequency of the servo loop or servo cycle, the motion of the UM especially in the low velocity region can be controlled in one single servo cycle. Movement of the actuator or the friction means, respectively, can be started and finished in one single servo cycle. While at least one of the resonance modes is responsible for high performance actuation, the at least one other mode compensates the friction nonlinearities. As a result, positioning accuracy of the UM is considerably enhanced at slow velocities. The difference between two eigenfrequencies which are dependent on the geometry, stiffness and the mass of piezoelectric plates is not in the audible range (i.e. higher than 15 kHz).

Due to the abovementioned fact that movements can be started and finished in one single servo cycle, controllability of the UM is simplified and enhanced. Since voltage fluctuation from one servo cycle to the subsequent one is reduced, less adaptive parameters are needed for a wide range of velocities.

The inventive method furthermore reduces the value of mean acceleration in one single servo cycle which is the main reason for friction induced vibration and noise with driving methods according to the prior art.

Not only simple trajectories, but also complex patterns of position and velocity profiles such as circles, arcs and ellipses can be followed with minimum tracking and contour errors by applying the inventive driving method. On the other hand, high precision scan patterns with dynamic step-settling characteristics with linear control algorithm like PID can be performed as well.

It can be advantageous if the at least two alternating excitation voltages $U_1$ and $U_2$ have a sinusoidal, rectangular or a triangular waveform, such that the resulting movement of the friction means has two sinusoidal trigonometric components with different amplitudes and frequencies. In case of a sinusoidal waveform, it can be advantageous if the at least two alternating excitation voltages $U_1$ and $U_2$ can be expressed by $U_1 = A_1 \sin(\omega_1 t + \phi_1)$ and $U_2 = A_2 \sin(\omega_2 t + \phi_2)$, with $A_1$ and $A_2$ being amplitudes, $\omega_1$ and $\omega_2$ being angular frequencies and $\phi_1$ and $\phi_2$ being phase angles of voltage signals.

It can also be advantageous if the frequency difference between the excitation voltages is in a range between 15 kHz and 25 kHz.

Furthermore, it can be advantageous if the at least one actuator is a rectangular piezoelectric plate. Here, it may be preferable that the actuator has at least two excitation electrodes on one of its main surfaces, and at least one common electrode on the other of its main surfaces, wherein the first excitation voltage $U_1$ is applied to at least one of the excitation electrodes and the second excitation voltage $U_2$ is applied to at least one of the other excitation electrodes, and with the common electrode being grounded.

However, it may also be preferable that the actuator has at least two excitation electrodes on one of its main surfaces, and at least one common electrode on the other of its main surfaces, wherein the first excitation voltage $U_1$ is applied to at least one of the excitation electrodes and the second excitation voltage $U_2$ is applied to at least one of the other excitation electrodes, and with the at least one common electrode being applied with a third excitation voltage $U_3$ with $U_3$ having a phase difference of 180° with respect to the first excitation voltage $U_1$ or to the second excitation voltage $U_2$.

The preceding expression 'main surface' of the rectangular piezoelectric plate describes the surfaces of the plate having the largest dimensions, i.e. largest area.

It can be beneficial that the ultrasonic motor comprises at least two actuators where the at least two actuators are combined by at least one coupling element. Here, it may prove useful that the first excitation voltage $U_1$ is applied to one of the two actuators, and with the second excitation voltage $U_2$ being applied to the other actuator. It may also prove useful that the at least two actuators are combined or connected by two coupling elements, where one of the coupling elements is built by the friction means.

It can be beneficial that the voltage of the second excitation signal is lower than the voltage of the first excitation signal. It is observed that the voltage value of second excitation signal is inversely dependent on motor velocity. Therefore, voltage level of second electrode can be adjusted to motor velocity.

The invention will now be described with reference to the appended drawings:

FIG. 1: Diagram showing the time-dependent position or movement, respectively, of the element to be driven of an UM, with the movement of the element to be driven being PID closed-loop controlled at a velocity of 0.2 mm/s according to the prior art FIG. 2: Schematic illustration of the forces acting on the friction means of an actuator of an UM during operation FIG. 3: Diagram showing the time-dependent force of the actuator of the UM with the PID closed-loop controlled movement of the element to be driven according to FIG. 1

Figure 4:
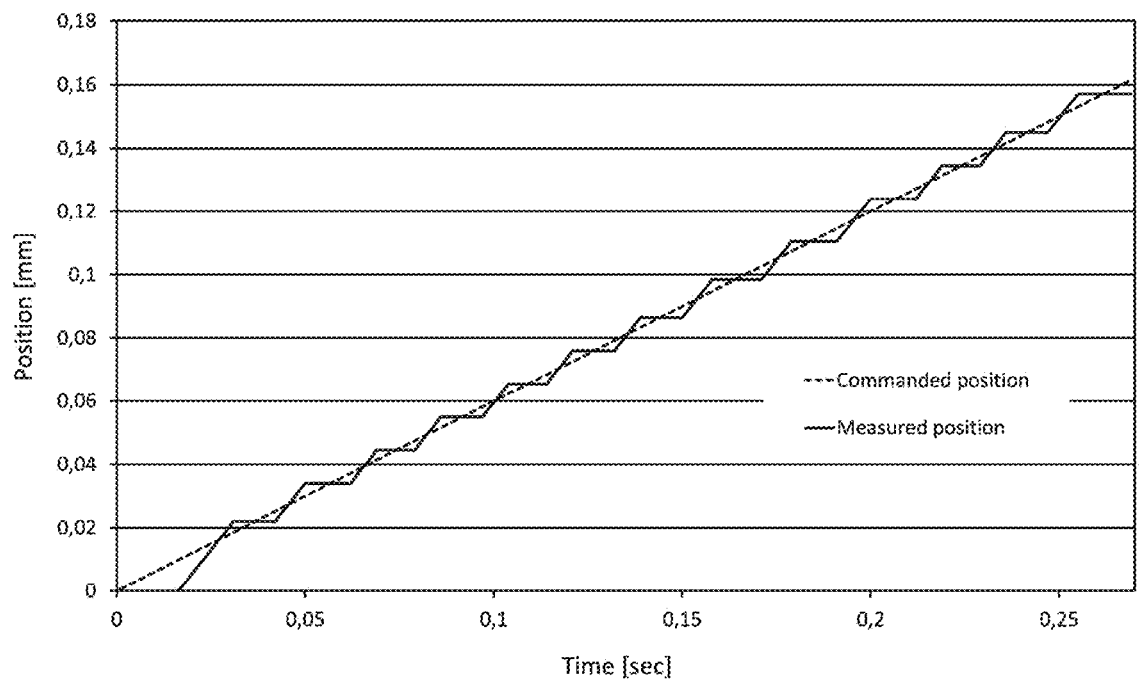

FIG. 4: Diagram showing the time-dependent position or movement, respectively, of the element to be driven of an UM, with the movement of the element to be driven being PID closed-loop controlled at a velocity of 0.6 mm/s according to the prior art FIG. 5: Diagram showing the time-dependent force of the actuator of the UM with the PID closed-loop controlled movement of the element to be driven according to FIG. 4

Figure 6:
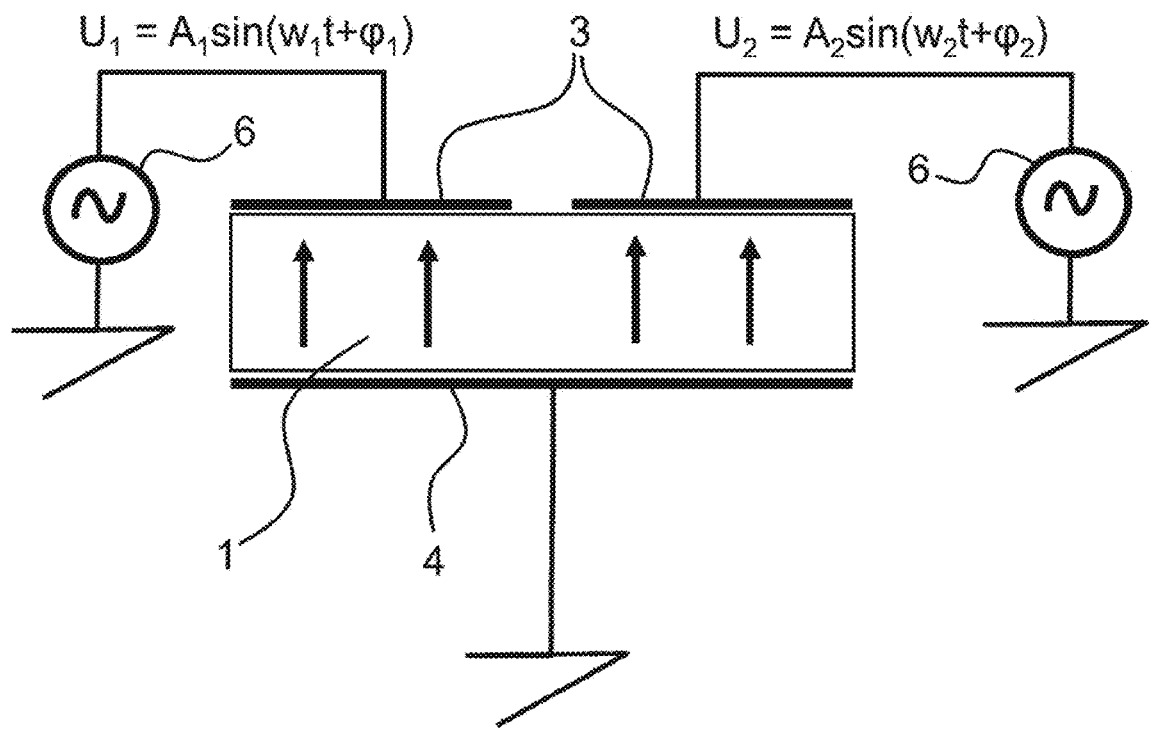

FIG. 6: Block diagram showing an embodiment for an electric connection of an actuator of an UM for application of the inventive driving method FIG. 7: Diagram showing the time-dependent position of the element to be driven of an UM, with the movement of the element to be driven being closed-loop controlled at a velocity of 0.2 mm/s according to the invention FIG. 8: Diagram showing the time-dependent force of the actuator of the UM with the closed-loop controlled movement of the element to be driven according to FIG. 7

Figure 9:
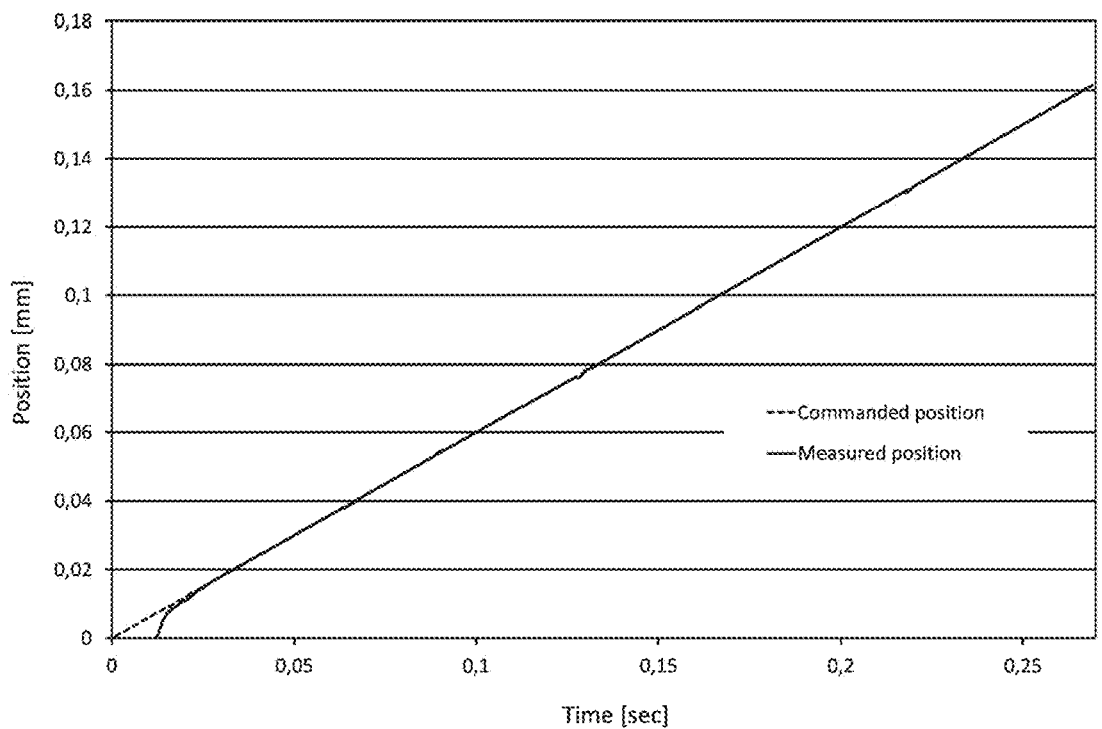

FIG. 9: Diagram showing the time-dependent position or movement, respectively, of the element to be driven of an UM, with the movement of the element to be driven being closed-loop controlled at a velocity of 0.6 mm/s according to the invention FIG. 10: Diagram showing the time-dependent force of the actuator of the UM with the closed-loop controlled movement of the element to be driven according to FIG. 9

Figure 11:
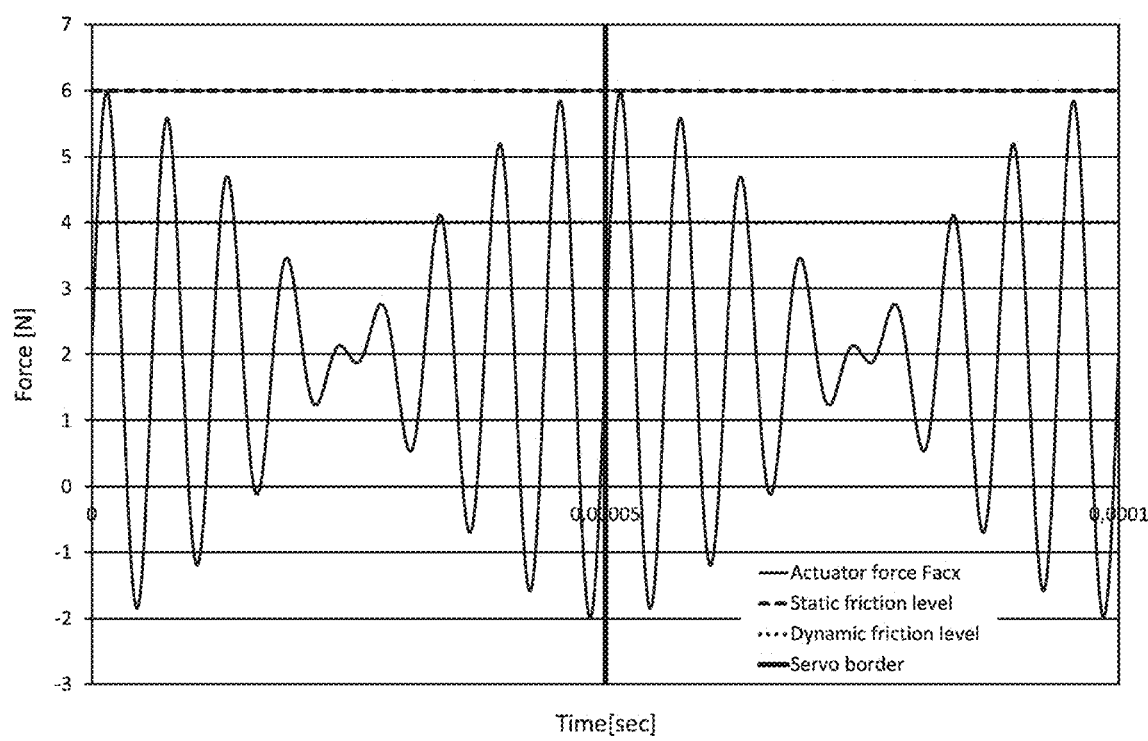

FIG. 11: Diagram showing the time-dependent force of the actuator of an UM with the inventive closed-loop controlled movement of the element to be driven over two subsequent servo cycles FIG. 12: Diagram showing the time-dependent acceleration of the actuator of an UM with the inventive closed-loop controlled movement of the element to be driven over two subsequent servo cycles according to FIG. 11

Figure 13:
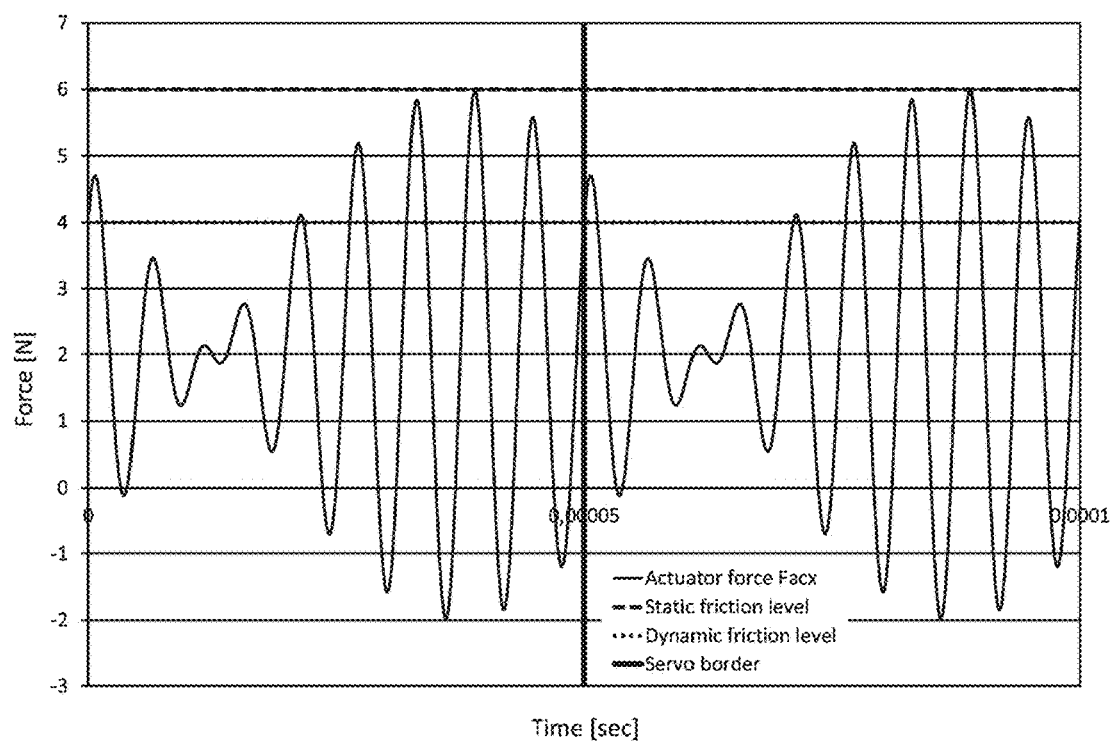
Figure 14:
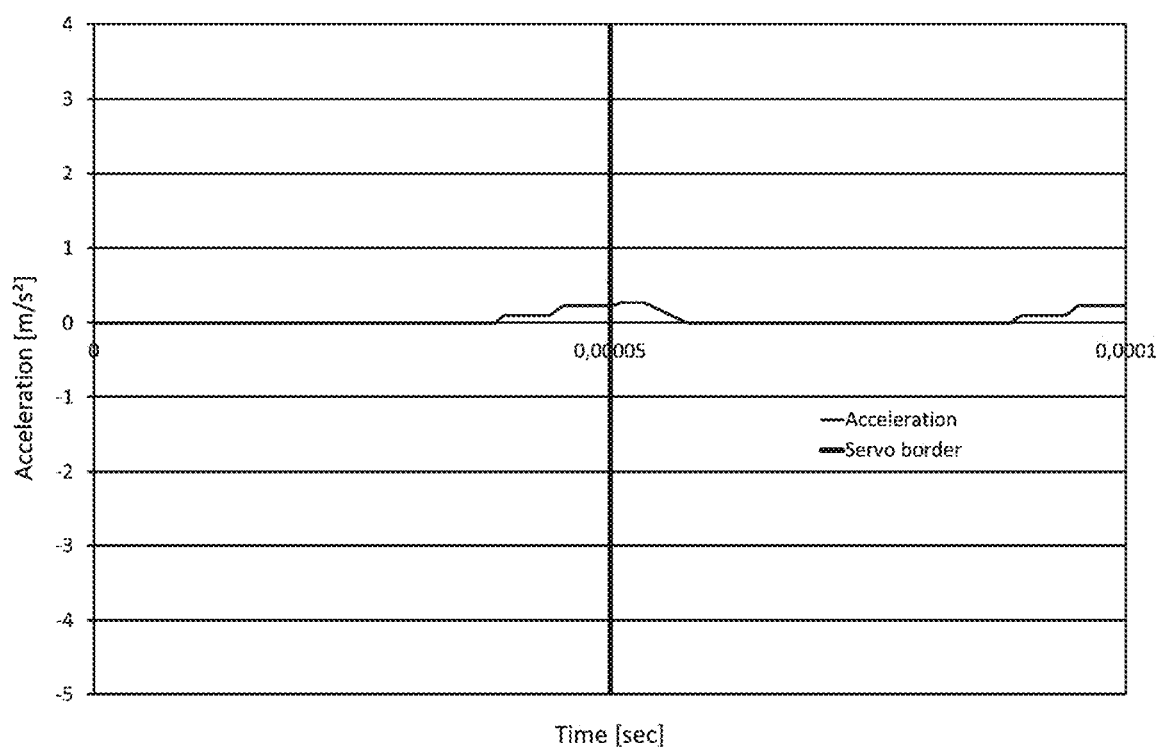

FIG. 13: Diagram showing the time-dependent force of the actuator of an UM with the inventive closed-loop controlled movement of the element to be driven over two subsequent servo cycles and with a phase difference between the applied voltages FIG. 14: Diagram showing the time-dependent acceleration of the actuator of an UM with the inventive closed-loop controlled movement of the element to be driven over two subsequent servo cycles and with a phase difference between the applied voltages according to FIG. 13

Figure 15:
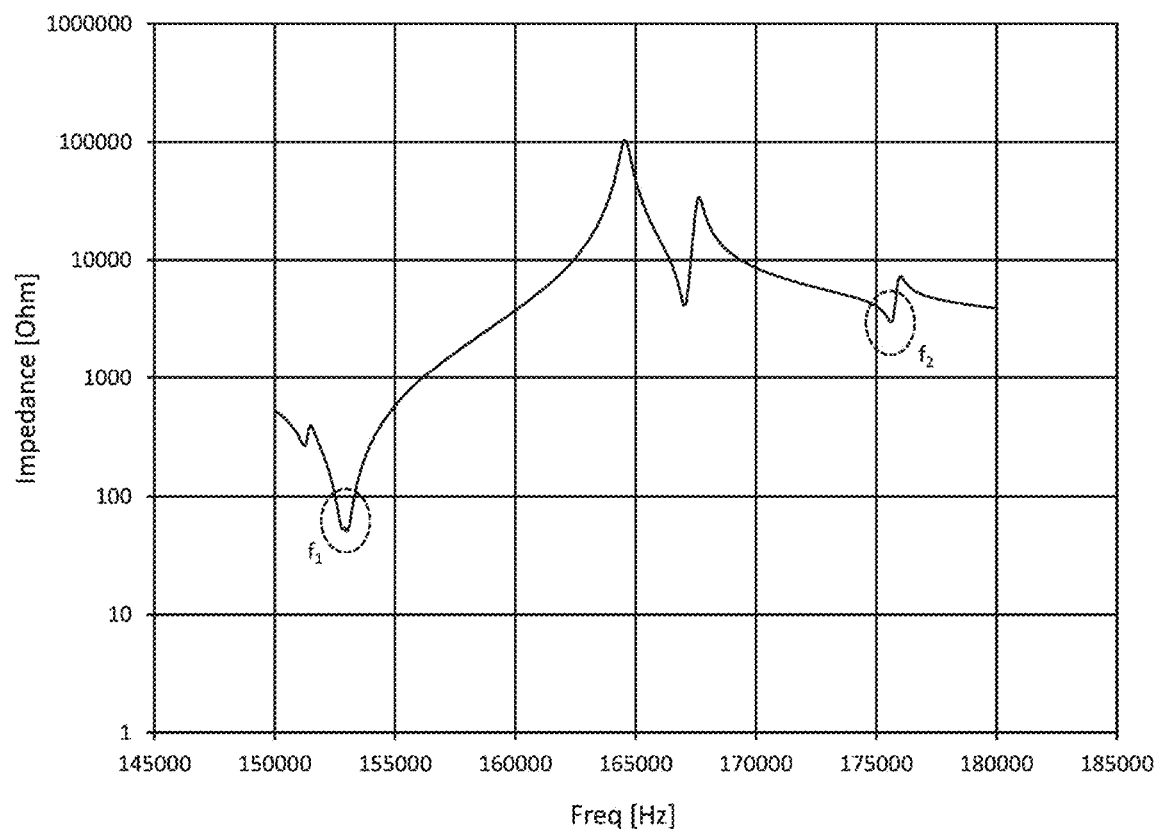

FIG. 15: Impedance diagram of an actuator of an UM showing two resonance frequencies or eigenfrequencies, respectively FIG. 16: Motion trajectory of the friction means of the actuator according to FIG. 14 while applying the inventive driving method and exciting the two eigenfrequencies of the actuator FIG. 17: Diagram showing the time-dependent force of the actuator of an UM with the inventive closed-loop controlled movement of the element to be driven over two subsequent servo cycles and with one of the applied excitation voltages having a reduced level compared to the other excitation voltage FIG. 18: Diagram showing the time-dependent acceleration of the actuator of an UM with the inventive closed-loop controlled movement of the element to be driven over two subsequent servo cycles according to FIG. 17

Figure 19:
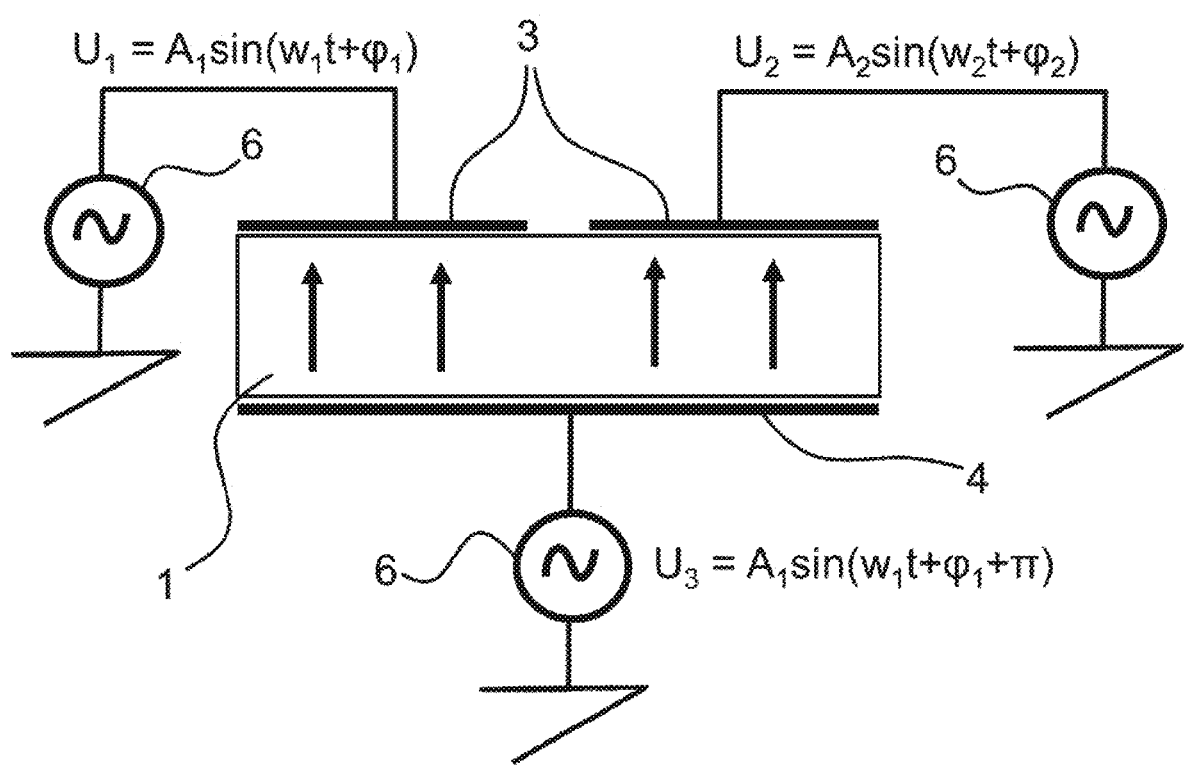

FIG. 19: Block diagram showing an embodiment for an electric connection of an actuator of an UM for application of the inventive driving method FIG. 20: Embodiment for an UM being intended for the application of the inventive driving method having two actuators FIG. 21: Block diagram showing an embodiment for an electric connection of the actuators of the UM according to FIG. 20 for application of the inventive driving method FIG. 1 shows a diagram with the time-dependent position or movement, respectively, of the element to be driven of a piezoelectric UM, with the movement of the element to be driven being PID closed-loop controlled at a velocity of 0.2 mm/s according to the prior art. The nonlinear response of the movement of the element to be driven can be clearly recognized from FIG. 1 where the element to be driven can track the commanded position trajectory only in a zigzag pattern, i.e. a repeating sequence of a motion phase (here, movement of the element to be driven takes place) and a non-motion phase with no movement of the element to be driven.

Figure 2:
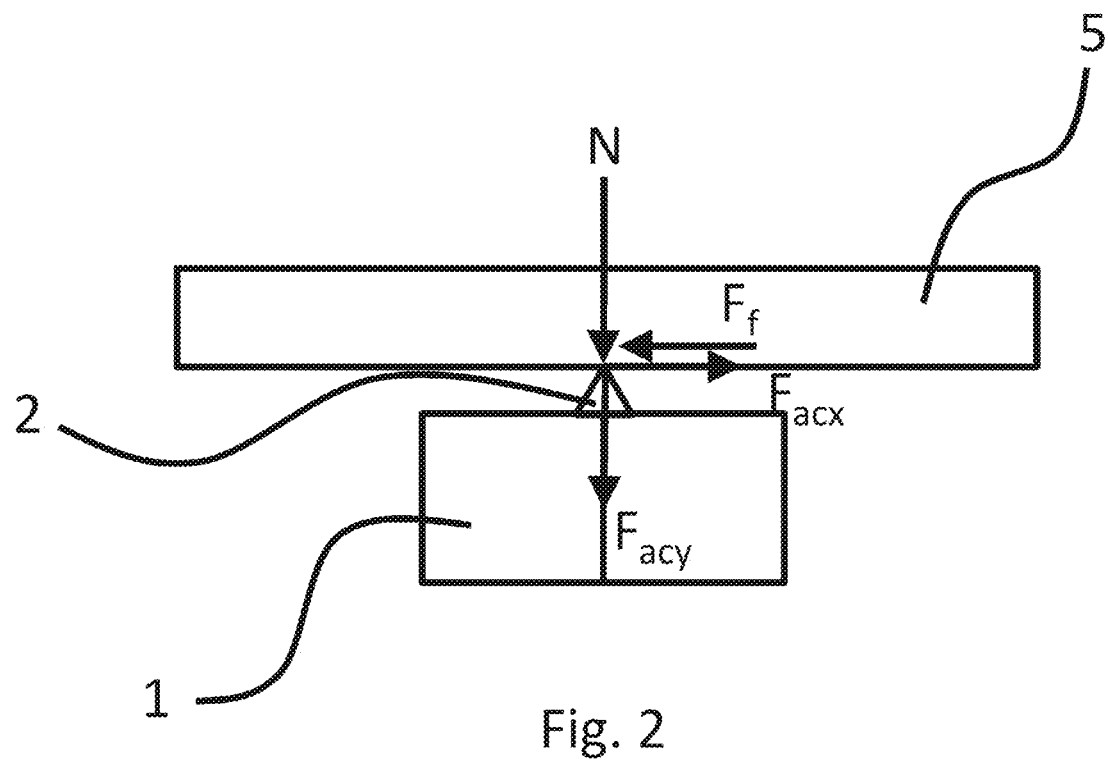

FIG. 2 is a schematic illustration explaining the forces acting on the friction means of an actuator of an UM during operation. There are two external forces acting on the friction means (realized here by a friction element attached to a side surface of the actuator): one is the normal force N having an operating direction that is substantially perpendicular to the side surface the friction element is attached to, and one is the friction force $F_f$ defined by the friction pair friction element-element to be driven, and with the friction force $F_f$ having an operating direction that is substantially parallel to the side surface the friction element is attached to.

Due to the excitation of the actuator, the actuator performs a periodic deformation which is transferred to the friction element, resulting in the actuator force or driving force $F_{acx}$ with an operating direction being antiparallel to the operating direction of the friction force $F_f$.

Furthermore, the excitation leads to periodic deformations of the actuator resulting in an additional actuator force $F_{acy}$ with an operating direction being parallel to the operating direction of the normal force. Said actuator force $F_{acy}$ has a constant value and reduces the magnitude of normal force thereby also reducing the friction force.

Figure 3:
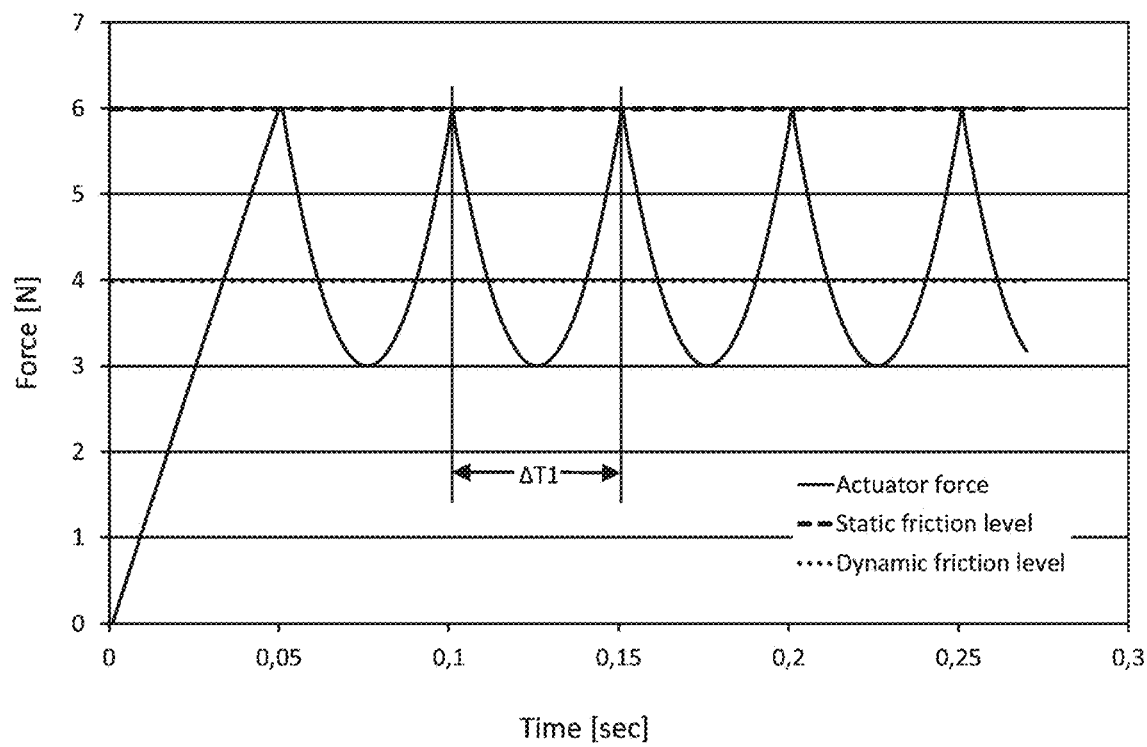

FIG. 3 shows a diagram illustrating the time-dependent force of the piezoelectric actuator of the piezoelectric UM driven with the method and the velocity according to FIG. 1. Starting at t=0 s, actuator force $F_{acx}$ is linearly rising until it reaches the static friction level determined by the friction pair friction means—element to be driven, and then severely drops. Before reaching the static friction level the first time, there is no movement of the element to be driven, as can be gathered from the corresponding time interval in FIG. 1 where the curve position vs. time runs horizontally. After the actuator force has reached the static friction level, it immediately drops and falls below the lower value of the dynamic friction level. As long as the value of the actuator force $F_{acx}$ is above the dynamic friction level, there exists movement of the element to be driven.

When the actuator force falls below the dynamic friction level, the element to be driven stops its movement. Subsequently, the actuator force rises again, and further movement of the element to be driven starts again when the actuator force $F_{acx}$ reaches the static friction level, followed by an immediate drop of the actuator force. Again, movement of the element to be driven is only existent till the actuator force falls below the dynamic friction level.

The aforesaid time-dependent behaviour of the actuator force is repeated several times, i.e. every time the actuator force $F_{acx}$ reaches the static friction level, actuator force $F_{acx}$ immediately drops and falls to a value below the dynamic friction level to subsequently raise again till the static friction level is reached. In other words, the actuator force $F_{acx}$ is alternating in between the static friction level and the dynamic friction level like a sinusoidal function, where the frequency of said sinusoidal-like function depends on the velocity and the PID parameters of the controller. A typical period of the sinusoidal-like actuator force variation, i.e. ($\Delta T_1$), for the velocity control of 0.2 mm/sec is 40 ms, resulting in an angular frequency of this variation of $\omega_0 = 2\pi / \Delta T_1 = 157$.

FIG. 4 shows a diagram with the time-dependent position or movement, respectively, of the element to be driven of a piezoelectric UM, with the movement of the element to be driven being PID closed-loop controlled at the higher velocity of 0.6 mm/s according to the prior art. Also with such higher velocity (compared to FIG. 1), a nonlinear response of the movement of the element to be driven results, where the element to be driven can track the commanded position trajectory again only in a zigzag pattern, i.e. a repeating sequence of a motion phase and a non-motion phase of the element to be driven, but with the amplitude of the zigzag pattern significantly reduced.

Figure 5:
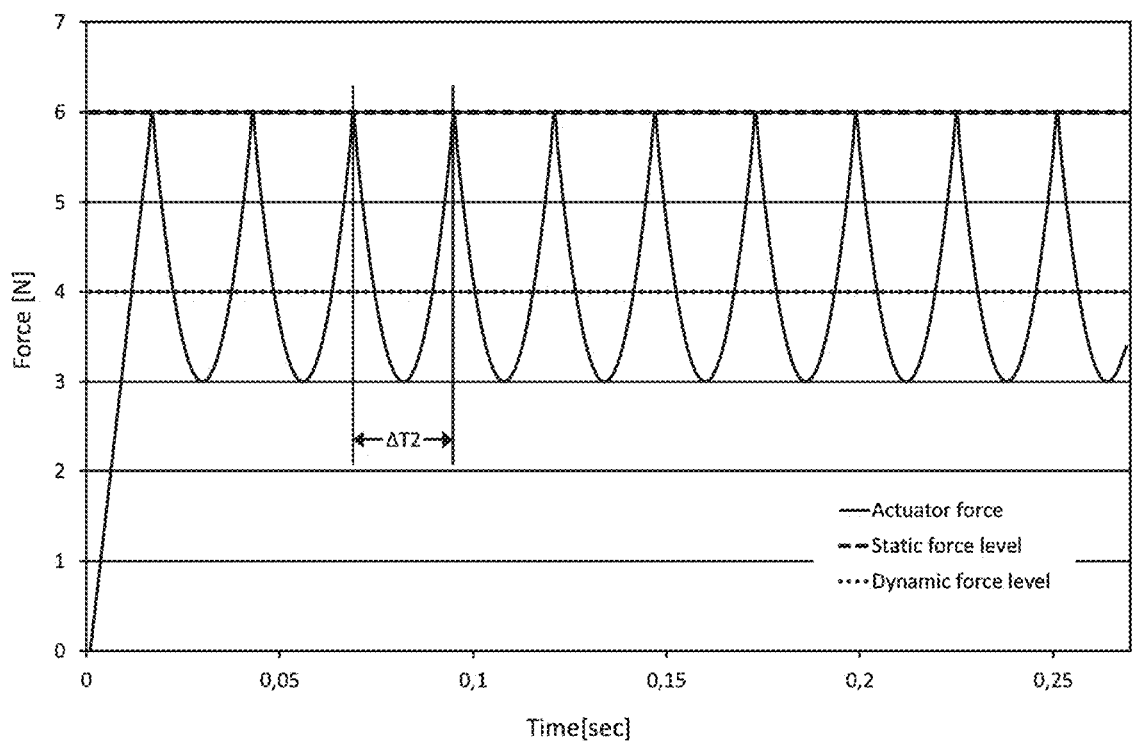

FIG. 5 shows a diagram illustrating the time-dependent force of the piezoelectric actuator of the UM driven with the method and the velocity according to FIG. 4. Similar to FIG. 3, every time the actuator force $F_{acx}$ reaches the static friction level, actuator force $F_{acx}$ immediately drops and falls to a value below the dynamic friction level to subsequently rise again till the static friction level is reached. In other words, the actuator force $F_{acx}$ is alternating in between the static friction level and the dynamic friction level like a sinusoidal function, where the frequency of said sinusoidal-like function is higher than that for the lower speed (see FIG. 3). Here, the period of the sinusoidal-like actuator force variation, i.e. ($\Delta T_2$), for the velocity control of 0.6 mm/sec is 18 ms, resulting in an angular frequency of this variation of $\omega_0 = 2\pi / \Delta T_2 = 349$.

The aforementioned sinusoidal-like actuator force variation leads to friction induced vibration. At low driving velocities, the amplitude of said vibration increases drastically, and such increased vibration amplitude results in an audible noise. Most critical is that velocity where the frequency of force variation matches the resonance frequency of the drive system where the UM is implemented.

FIG. 6 is a block diagram showing an embodiment for an electric connection of a piezoelectric actuator 1 of an UM for application of the inventive driving method with the actuator having two separate excitation electrodes 3 arranged in a spaced manner on one of its main surfaces, and one common electrode 4 arranged on the other and opposite main surface of the rectangular shaped actuator. While the common electrode 4 is grounded, each of the two excitation electrodes 3 is simultaneously applied with a separate voltage. Here, the left excitation electrode in FIG. 6 is applied with the voltage $U_1$ that equals to $A_1 \sin(\omega_1 t + \varphi_1)$, generated by the electrical generator 6, and the right excitation in FIG. 6 is applied at the same time with the voltage $U_2$ that equals to $A_2 \sin(\omega_2 t + \varphi_2)$, generated by a different and separate electric generator 6. The frequency of $U_1$ corresponds to a first resonance frequency of the actuator and the frequency of $U_2$ corresponds to a second resonance frequency of the actuator, and with the frequency difference between $U_1$ and $U_2$ deviating from a servo sampling frequency of the controller by 5 kHz at the most. The arrows in FIG. 6 represent the polarization direction of the piezoelectric material of the actuator 1.

Figure 7:
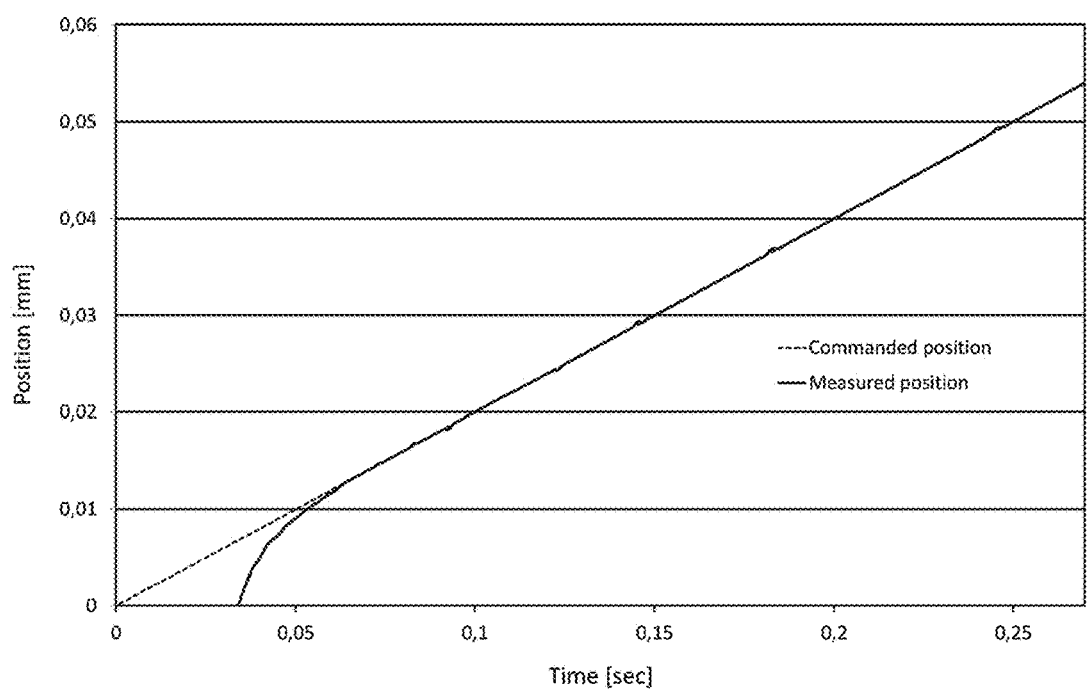
Figure 8:
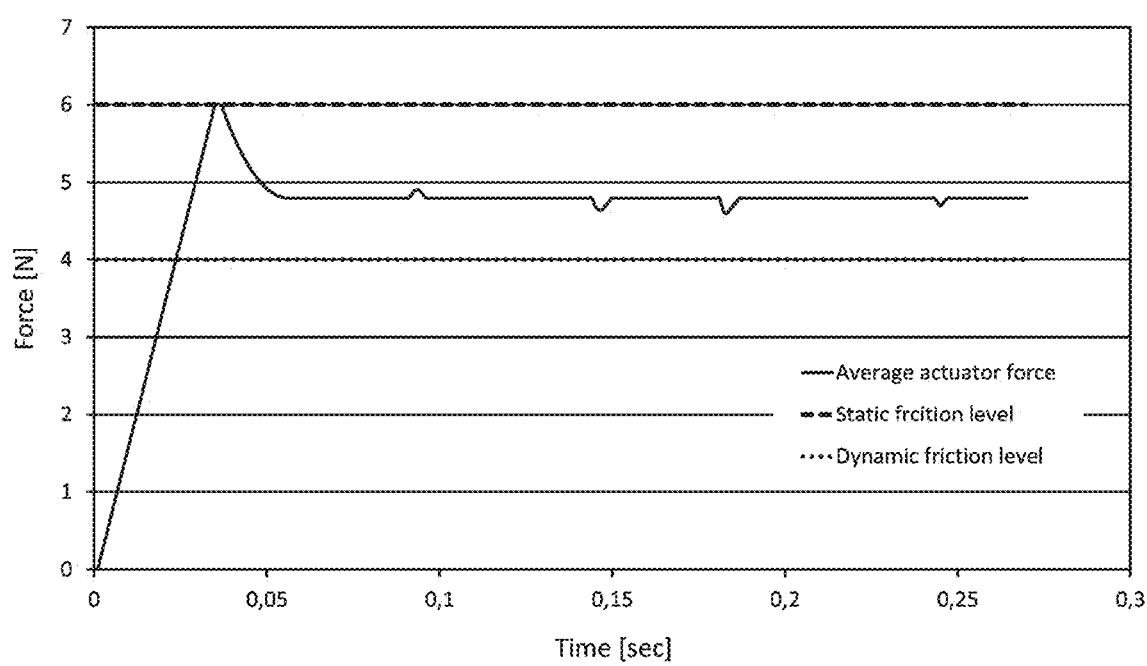

FIG. 7 shows a diagram with the time-dependent position or movement, respectively, of the element to be driven of a piezoelectric UM, with the movement being closed-loop controlled at a velocity of 0.2 mm/s according to the invention, while FIG. 8 shows a diagram with the time-dependent average actuator force corresponding to the diagram of FIG. 7.

Compared to FIGS. 1 and 3 illustrating the time-dependent position of the element to be moved with a method according to the prior art commanding the same velocity, i.e. 0.2 mm/s, it can be clearly gathered that with FIG. 7, there is no zigzag pattern for the measured position of the element to be driven. Instead, after a very short initial delay period where the element to be driven shows no movement, a rapid adjustment of the measured position curve to the curve of the commanded position takes place, and with both curves showing nearly perfect overlapping subsequently.

The corresponding curve for the time-dependent average actuator force shows—starting from time $t=0$ s—a linearly increasing actuator force where the increase stops when the static friction level has been reached. At the corresponding time, movement of the element to be driven starts. After having reached the static friction level, the average actuator force drops, but then stabilizes at an almost time-constant value well above the dynamic friction level. In other words, after a short settling process, the average actuator force remains nearly stable. This behaviour is very different to the time-dependent actuator force behaviour according to FIG. 3. The nearly stable average actuator force results in the desired linear behaviour as regards the time-dependent position of the element to be moved.

Figure 10:
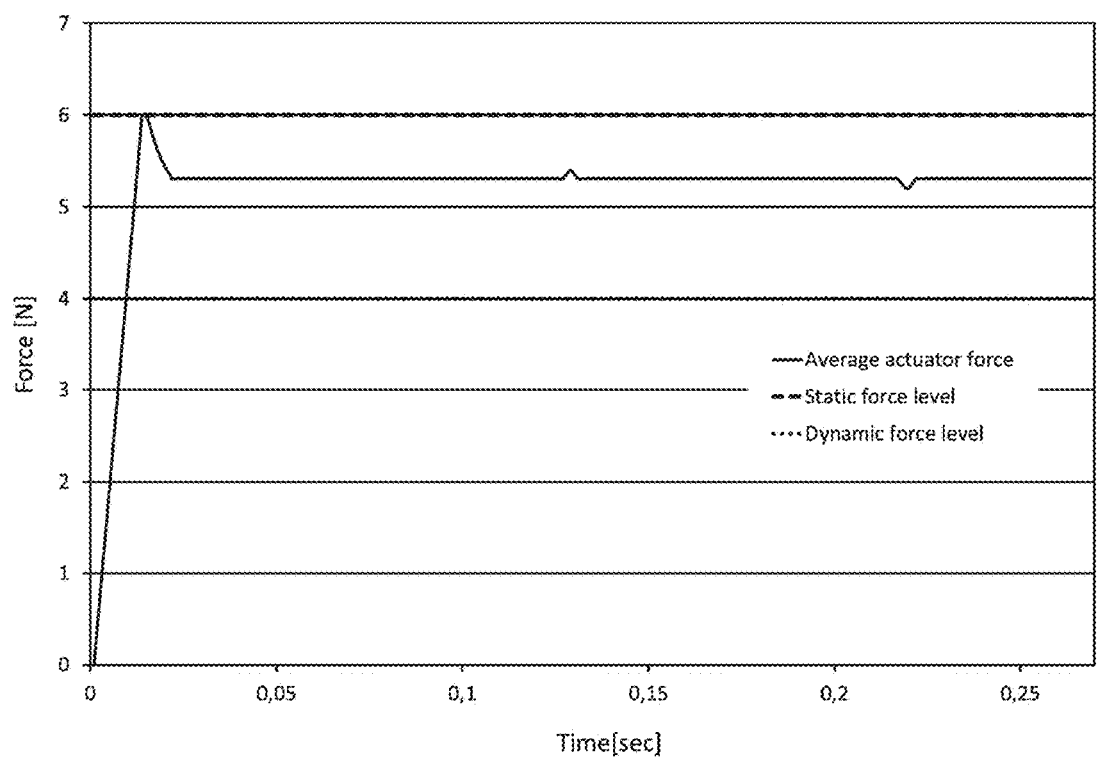

FIGS. 9 and 10 are very similar to FIGS. 7 and 8, with the only difference being the higher commanded speed of 0.6 mm/s for the movement of the element to be moved. Thus, the aforementioned description with respect to FIGS. 7 and 8 is also valid for FIGS. 9 and 10. Again, it can be seen that after a very short delay period, the measured position of the element to be moved is at any time identical or nearly identical to the commanded position (FIG. 9), i.e. there is no or almost no deviation between the commanded position and the real position of the element to be moved. This behaviour can be explained by the corresponding time-dependent average actuator force according to FIG. 10, where—after a fast linear increase—the average actuator force reaches the static friction level, and then decreases a little to reach thereafter an almost perfect stable level which is well above the dynamic friction level.

The diagram of FIG. 11 shows the time-dependent force of the piezoelectric actuator of an UM with the inventive closed-loop controlled movement over two servo cycles, with the vertical line in FIG. 11 illustrating the border between the two subsequent servo cycles. From FIG. 11 it can be gathered that the actuator force $F_{acx}$ is modulated within each servo cycle, which is different to the prior art where the amplitude of the actuator force within a servo cycle has a constant value as with the prior art there is no possibility to influence the amplitude level of the actuator force within one servo cycle.

Starting at time t=0 s in FIG. 11, the amplitude of the first oscillation of the actuator force reaches the static friction level, while the amplitude of the subsequent oscillations continuously decreases till a minimum value, and with the amplitude of the following oscillations of the actuator force continuously rising till the amplitude again reaches the static friction level shortly after start of the subsequent servo cycle.

Figure 12:
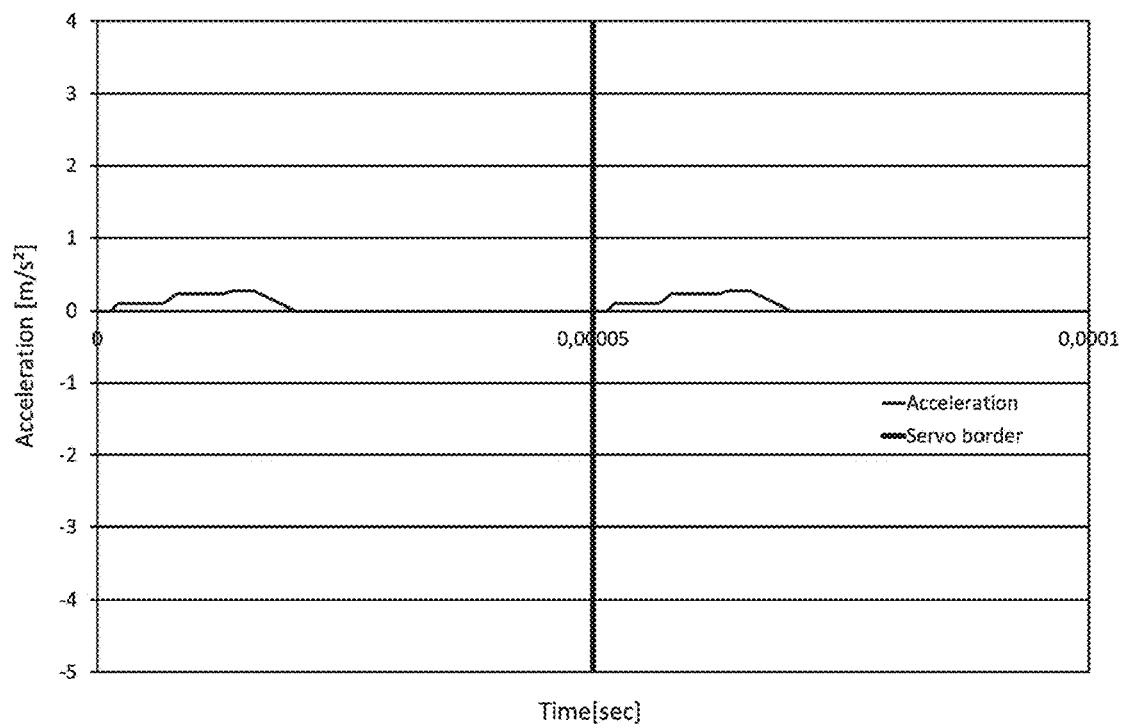

FIG. 12 illustrates the acceleration of the element to be driven according to the time-dependent actuator force behaviour of FIG. 11. Starting at time t=0 s, there is a very short period where acceleration remains at zero value to make a first stepwise increase afterwards with said first stepwise increase being at the time when the amplitude of the first oscillation of the actuator force reaches the static friction level. Although the amplitude of the subsequent two oscillations of the actuator force are lower than that of the first oscillation (which amplitude reached to the static friction level), there are, with each corresponding oscillation, further distinctive steps of the acceleration existent. The following oscillations having an amplitude lower than the static friction level do not lead to a further acceleration of the element to be driven; instead, the acceleration of the element to be driven decreases in the corresponding time period to zero value. The next stepwise increase of acceleration can be detected when the amplitude of the oscillation of the actuator force again reaches the static friction level.

That means that with the inventive method a variation or modulation, respectively, of the amplitude of the actuator force oscillations within one servo cycle is possible, and as such, very short time periods within acceleration of the element to be driven reaches a maximum value are realizable.

As a result, a small position change of the element to be driven during one servo cycle can be obtained due to the modulation of actuator force. Control unit in the subsequent servo sampling time does not need to reduce the voltage amplitude drastically to reduce actuator force less than dynamic friction level for a braking procedure. With the inventive method, the element to be driven—within one servo cycle—stops without the requirement of any additional brake action. Therefore, movement controllability at low velocity is enhanced. Higher control parameters are not required in order to reduce voltage extremely for braking.

Even if a motion of the element to be driven begins in a servo cycle, but does not stop within the same servo cycle (what can be gathered from FIGS. 13 and 14), maximum acceleration would be small enough that the motor stops at the beginning of next servo cycle. Phase difference between two oscillatory motions is always changing from one servo cycle to the next one. As a result of the lower mean acceleration value, the low velocity squeak and noise due to the friction induced vibrations is drastically reduced or even completely eliminated.

FIG. 15 shows an impedance diagram of a piezoelectric actuator of an UM showing two resonance frequencies or eigenfrequencies, respectively. Said two resonance frequencies differ from each other by about 22 kHz.

Figure 16:
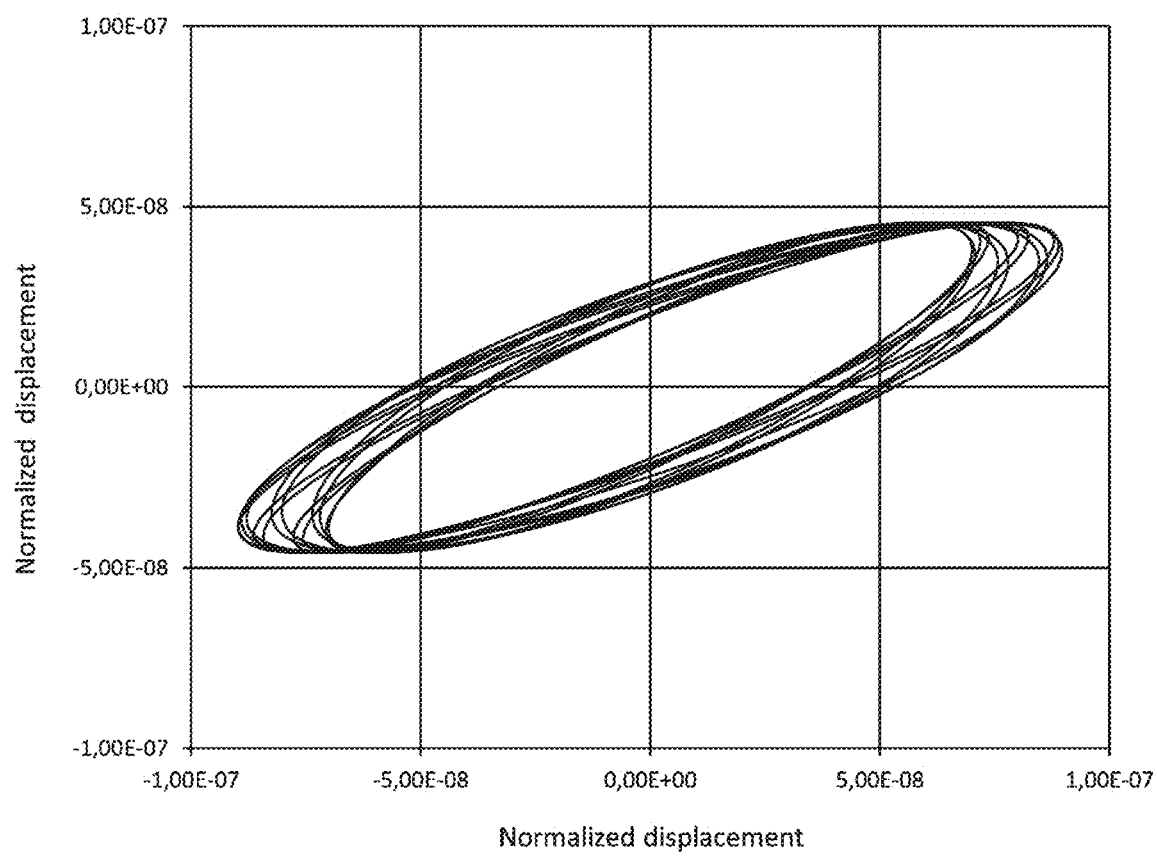

FIG. 16 shows the motion trajectory of the friction means of the piezoelectric actuator according to FIG. 15 while applying the inventive driving method and exciting the two eigenfrequencies of the piezoelectric actuator. Movement of the friction means has two sinusoidal trigonometric components with different amplitudes and frequencies. Therefore, direction of movement changes with respect to time. By using this driving method, actuator forces at the tip of the friction means are varied in a way that both high performance actuation without any remarkable efficiency loss and low velocity motions without any noise or squeak are easily achievable.

Figure 17:
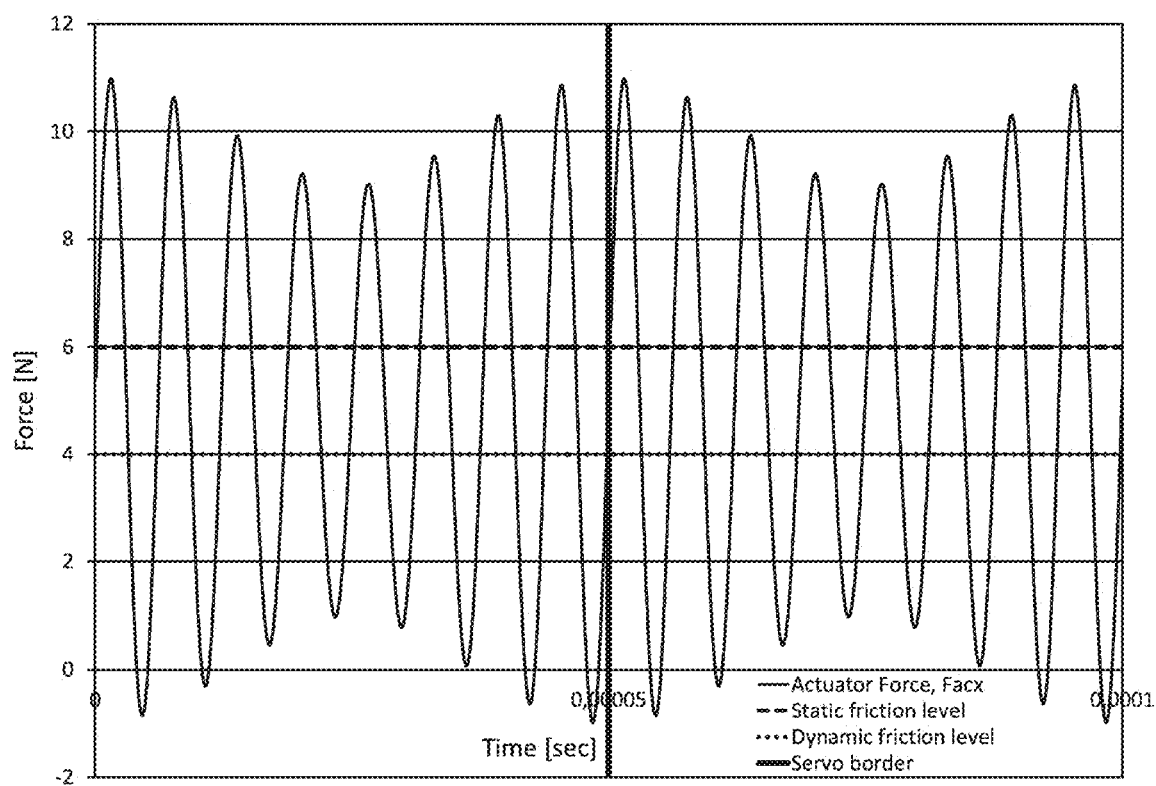
Figure 18:
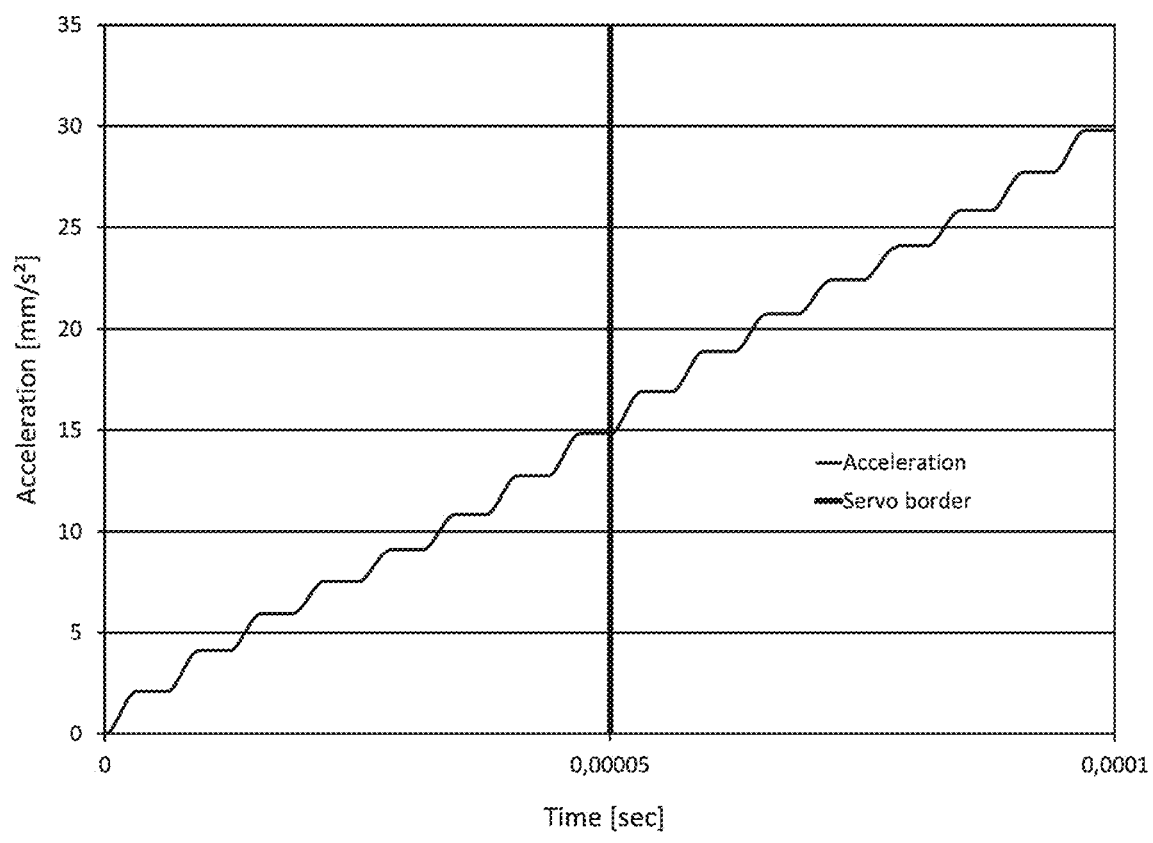

The diagram of FIG. 17 shows the time-dependent force of the piezoelectric actuator of an UM with the inventive closed-loop controlled movement over two servo cycles and with the voltage for exciting the second resonance mode having a reduced level compared to the other excitation voltage, and the diagram of FIG. 18 shows the corresponding time-dependent acceleration of the piezoelectric actuator. By reducing the voltage level for excitation of the second resonance mode, a higher driving performance of the UM can be achieved. When the voltage for excitation of the second resonance mode, which is inversely proportional to the velocity of the element to be driven, decreases, effect of second resonance mode diminishes at higher velocities. This allows the UM actuating as with a single phase driving. As such, the aforesaid driving method at high performance actuation can resemble to the actuation one-phase driving. Accordingly, higher velocity and force would are achievable with the inventive driving method as well.

FIG. 19 corresponds to a block diagram showing an embodiment for an electric connection of a piezoelectric actuator of an UM for application of the inventive driving method. Here, each of the excitation electrodes is connected to a separate voltage source, one of them generating the excitation voltage $U_1 = A_1 \sin(\omega_1 t + \varphi_1)$, and the other generating the excitation voltage $U_2 = A_2 \sin(\omega_2 t + \varphi_2)$, $U_1$ and $U_2$ having different frequencies, and with the frequency of $U_1$ corresponding to a first resonance frequency of the actuator and the frequency of $U_2$ corresponding to a second resonance frequency of the actuator and with the frequency difference between $U_1$ and $U_2$ deviating from a servo sampling frequency of the controller by 5 kHz at the most. An excitation voltage $A_1 \sin(\omega_1 t + \varphi_1 + \pi)$, which is inverted to the excitation voltage $U_1$, is applied to the common electrode of the actuator. The arrows in FIG. 19 are indicating the polarization direction of the piezoelectric material of the actuator 1.

Figure 20:
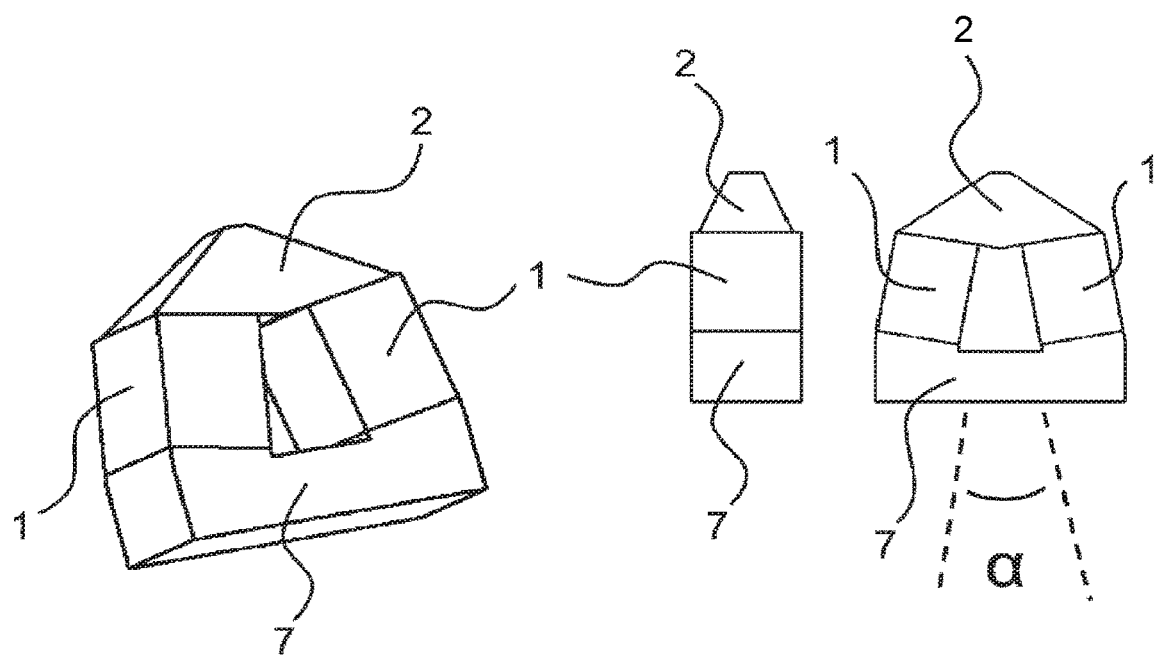
Figure 21:
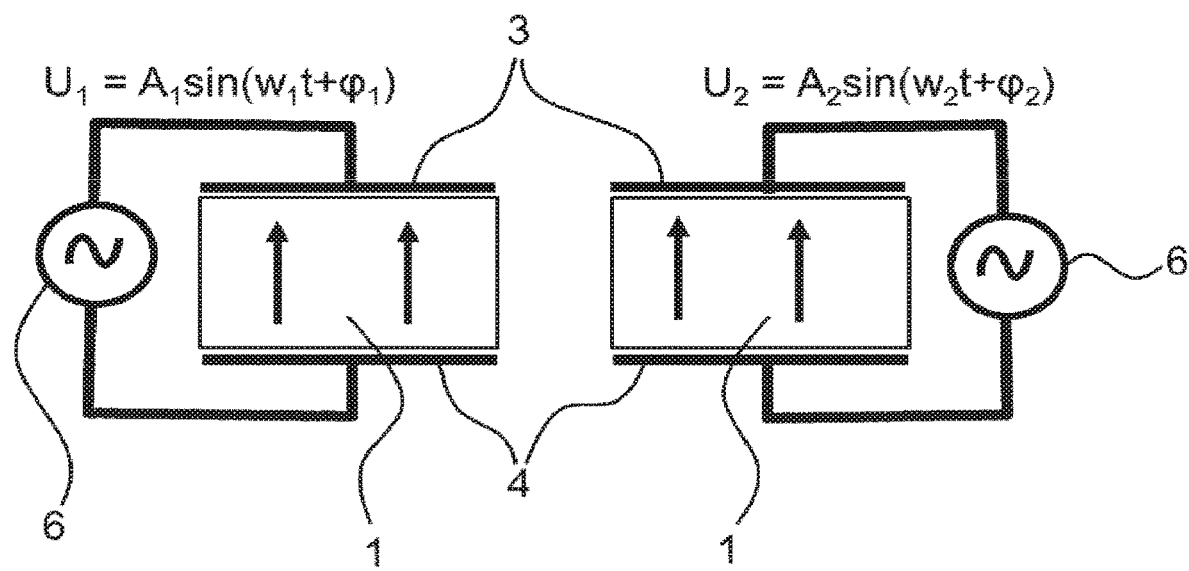

While FIG. 20 shows an embodiment for an UM having two piezoelectric actuators, FIG. 21 illustrates a block diagram for an electric connection of the piezoelectric actuators of the UM according to FIG. 20 for application of the inventive driving method.

The UM according to FIG. 20 contains two identical columnar shaped piezoelectric actuators 1, each of which being attached with one end portion to a common base representing a first coupling element 7 which is made of metal, but other materials like plastic or structure ceramic material were also possible. The respective other end portions of the two actuators are connected or coupled via a roof-shaped friction means 2 which is made of an oxide ceramic, the friction means 2 representing a second coupling element. The actuators 1 are arranged such that they are not parallel oriented; instead, the actuators define an angle a between them with a value ranging from 30° to 60°.

According to FIG. 21, one of the actuators 1 or its electrodes 3 and 4, respectively, is applied with the voltage $U_1 = A_1 \sin(\omega_1 t + \varphi_1)$, while the other and separate actuator 1 or its electrodes 3 and 4, respectively, is simultaneously applied with the voltage $U_2 = A_2 \sin(\omega_2 t + \varphi_2)$. Here, each actuator 1 has one excitation electrode 3 and one common electrode 4. The arrows in FIG. 21 are indicating the polarization direction of the piezoelectric material of each actuator 1.

The invention claimed is:

1. A method for closed-loop motion control with position feedback of an ultrasonic motor having at least one actuator with at least one excitation electrode and with at least one common electrode, an element to be driven, a controller, and at least one electrical generator for generating at least a first excitation voltage $U_1$ and a second excitation voltage $U_2$ to be applied to the at least one excitation electrode and the at least one common electrode of the at least one actuator for generating vibration of the at least one actuator, wherein a friction means of the at least one actuator, due to vibration, is arranged to intermittently contact the element to be driven for generating a driving force on the element to be driven, wherein the method comprises:
providing said first excitation voltage $U_1$ and said second excitation voltage $U_2$ with different frequencies, the frequency of the first excitation voltage $U_1$ corresponding to a first resonance frequency of the at least one actuator and the frequency of the second excitation voltage $U_2$ corresponding to a second resonance frequency of the at least one actuator, with a frequency difference between the first excitation voltage $U_1$ and the second excitation voltage $U_2$ deviating from a servo sampling frequency of the controller by 5 kHz at most; and
simultaneously applying said first excitation voltage $U_1$ and said second excitation voltage $U_2$ to the at least one excitation electrode and the at least one common electrode of the at least one actuator.

2. The method according to claim 1, wherein the first excitation voltage $U_1$ and the second excitation voltage $U_2$ have a sinusoidal, rectangular or a triangular waveform, such that resulting movement of the friction means has two sinusoidal trigonometric components with different amplitudes and frequencies.

3. The method according to claim 2, wherein the first excitation voltage $U_1$ and the second excitation voltage $U_2$ have a sinusoidal waveform with $U_1=A_1 \sin(\omega_1 t+\varphi_1)$ and with $U_2=A_2 \sin(\omega_2 t+\varphi_2)$, with $A_1$ and $A_2$ being amplitudes, $\omega_1$ and $\omega_2$ being angular frequencies and $\varphi_1$ and $\varphi_2$ being phase angles of voltage signals.

4. The method according to claim 1, wherein the frequency difference is in a range between 15 kHz and 25 kHz.

5. The method according to claim 1, wherein the at least one actuator is a rectangular piezoelectric plate.

6. The method according to claim 5, wherein the at least one actuator has at least two excitation electrodes on one of a plurality of main surfaces, and at least one common electrode on another of plurality of main surfaces, wherein the method comprises:
applying the first excitation voltage $U_1$ to at least one of the at least two excitation electrodes and applying the second excitation voltage $U_2$ simultaneously to the other of the two excitation electrodes, with the common electrode being grounded.

7. The method according to claim 5, wherein the at least one actuator has at least two excitation electrodes on one of plurality of main surfaces, and at least one common electrode on another of the plurality main surfaces, wherein the method comprises:
applying the first excitation voltage $U_1$ to at least one of the at least two excitation electrodes and applying the second excitation voltage $U_2$ simultaneously to at least one other of the at least two excitation electrodes; and
applying the at least one common electrode simultaneously with a third excitation voltage $U_3$, with $U_3$ having a phase difference of 180° with respect to the at least one first excitation voltage $U_1$ or to the at least one second excitation voltage $U_2$.

8. The method according to claim 1, wherein the ultrasonic motor includes at least two actuators combined by at least one coupling element.

9. The method according to claim 8, wherein the friction means constitutes the at least one coupling element.

10. The method according to claim 8, wherein the ultrasonic motor includes two actuators, the method comprising:
applying the first excitation voltage $U_1$ to one of the two actuators; and
applying the second excitation voltage $U_2$ to another of the two actuators.

11. The method according to claim 1, comprising:
controlling, by a closed-loop motion control, an ultrasonic motor in biomedical devices, in robotic arms, in medical operations, or in microscopy stages.

12. An ultrasonic motor comprising:
at least one actuator with a friction means, with at least one excitation electrode and with at least one common electrode;
an element to be driven;
a controller for closed-loop motion with position feedback; and
at least one electrical generator for generating at least a first excitation voltage $U_1$ and a second excitation voltage $U_2$ to be simultaneously applied to the at least one excitation electrode and the at least one common electrode of the actuator for generating vibration of the at least one actuator, the friction means of the at least one actuator being arranged to, when vibrated, intermittently contact with the element to be driven for generating a driving force on the element to be driven, the at least the first excitation voltage $U_1$ and the second excitation voltage $U_2$ having different frequencies, the frequency of the first excitation voltage $U_1$ corresponding to a first resonance frequency of the at least one actuator and the frequency of the second excitation voltage $U_2$ corresponding to a second resonance frequency of the at least one actuator, with a frequency difference between the first excitation voltage $U_1$ and the second excitation voltage $U_2$ deviating from a servo sampling frequency of the controller by 5 kHz at the most.

13. The method according to claim 3, wherein the frequency difference is in a range between 15 kHz and 25 kHz.

14. The method according to claim 13, wherein the at least one actuator is a rectangular piezoelectric plate.

15. The method according to claim 14, wherein the ultrasonic motor includes at least two actuators combined by at least one coupling element.

16. The method according to claim 9, wherein the ultrasonic motor includes two actuators, the method comprising:
applying the first excitation voltage $U_1$ to one of the two actuators; and
applying the second excitation voltage $U_2$ to another of the two actuators.

* * * * *